United States Patent
Chen et al.

(10) Patent No.: US 9,389,948 B2
(45) Date of Patent: Jul. 12, 2016

(54) METHOD AND SYSTEM FOR FIXING LOOPHOLES

(71) Applicant: TENCENT TECHNOLOGY (SHENZHEN) COMPANY LIMITED, Shenzhen, Guangdong (CN)

(72) Inventors: Qiru Chen, Shenzhen (CN); Yang Liu, Shenzhen (CN); Pinfu Ou, Shenzhen (CN); Xin Deng, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 402 days.

(21) Appl. No.: 14/072,959

(22) Filed: Nov. 6, 2013

(65) Prior Publication Data

US 2014/0089747 A1    Mar. 27, 2014

Related U.S. Application Data

(63) Continuation of application No. PCT/CN2013/081857, filed on Aug. 20, 2013.

(30) Foreign Application Priority Data

Aug. 21, 2012    (CN) .......................... 2012 1 0298868

(51) Int. Cl.
   *G06F 11/00*    (2006.01)
   *G06F 11/07*    (2006.01)
   *G06F 21/55*    (2013.01)
   *G06F 21/57*    (2013.01)
   *G06F 9/445*    (2006.01)

(52) U.S. Cl.
   CPC .......... *G06F 11/0793* (2013.01); *G06F 21/556* (2013.01); *G06F 21/57* (2013.01); *G06F 8/65* (2013.01)

(58) Field of Classification Search
   CPC .................................................. G06F 11/0793
   See application file for complete search history.

(56) References Cited

U.S. PATENT DOCUMENTS

| | | | |
|---|---|---|---|
| 6,754,346 B2 | 6/2004 | Eiserling et al. | |
| 7,810,159 B2 | 10/2010 | Bowden et al. | |
| 7,827,545 B2 * | 11/2010 | Choe | G06F 21/57 717/168 |
| 8,151,258 B2 | 4/2012 | Russell et al. | |
| 8,161,559 B2 * | 4/2012 | Bowden | G06F 21/568 713/188 |
| 2004/0006704 A1 | 1/2004 | Dahlstrom et al. | |
| 2005/0033582 A1 * | 2/2005 | Gadd | G06Q 30/02 704/277 |
| 2006/0129931 A1 * | 6/2006 | Simons | G06F 9/4446 715/705 |
| 2007/0043831 A1 * | 2/2007 | Kessler | H04L 67/34 709/219 |
| 2007/0083535 A1 * | 4/2007 | Zilliacus | G06F 17/30905 |

(Continued)

OTHER PUBLICATIONS

Canadian Intellectual Property Office, "First Office Action of CA Application No. 2,862,077", Aug. 25, 2015.

(Continued)

*Primary Examiner* — Christopher McCarthy
(74) *Attorney, Agent, or Firm* — Tim Tingkang Xia, Esq.; Locke Lord LLP

(57) ABSTRACT

The present invention discloses method and system for debugging, and a non-transitory computer-readable medium that stores instructions of debugging. The method includes when a loophole is detected, determining whether a network is online; if yes, fixing the loophole; otherwise, prompting a user to make the network online, and fixing the loophole when the network is online, so as to avoid debugging failure caused by a failure of patch downloading when the network is offline, thereby reducing the failure rate of debugging.

9 Claims, 5 Drawing Sheets

(56) References Cited

U.S. PATENT DOCUMENTS

2011/0302566 A1 12/2011 Abadi et al.
2012/0102480 A1* 4/2012 Hopmann ................. G06F 8/67
 717/172

OTHER PUBLICATIONS

State Intellectual Property Office of the People's Republic of China, "International Search Report", Nov. 28, 2013, China.

* cited by examiner

METHOD AND SYSTEM FOR FIXING LOOPHOLES

CROSS-REFERENCE TO RELATED APPLICATIONS

This application is a continuation application of International Patent Application No. PCT/CN2013/081857, filed Aug. 20, 2013, which itself claims the priority to Chinese Patent Application No. 201210298868.5, filed Aug. 21, 2012 in the State Intellectual Property Office of P.R. China, which is hereby incorporated herein in its entirety by reference.

FIELD OF THE INVENTION

The present invention relates to the field of computers, and more particularly to method and system for fixing loopholes.

BACKGROUND OF THE INVENTION

In the use of client terminal, users may frequently find loopholes (i.e., bugs or vulnerabilities) existing in specific implementations of hardware, software and protocols, or system security policies in a system. The loopholes may enable an attacker to compromise the system, which significantly affects the security of the system. Therefore, timely fixing the loopholes (i.e., debugging) is required so as to improve the security of the system.

Conventionally, when a loophole is detected, a terminal establishes a connection with a server, downloads a patch corresponding to the loophole, and installs the patch therein to fix the loophole. However, if the current network is offline, the terminal cannot establish the connection with the server, which certainly makes downloading of the patch failure, thereby resulting in debugging failure and increasing the failure rate of the debugging.

Therefore, a heretofore unaddressed need exists in the art to address the aforementioned deficiencies and inadequacies.

SUMMARY OF THE INVENTION

Embodiments of the present invention provide method and system for debugging, and a non-transitory computer-readable medium that stores instructions of the debugging, so as to reduce the failure rate of the debugging.

In one aspect of the present invention, the method for debugging includes when a loophole is detected, determining whether a network is online; if yes, fixing the loophole; and otherwise, prompting a user to make the network online, and fixing the loophole when the network is online.

In one embodiment, before the step of determining whether the network is online, the method further includes generating a loophole notification according to the detected loophole, and displaying the loophole notification; and correspondingly, the step of prompting the user to make the network online includes prompting, on the loophole notification, the user to make the network online.

In one embodiment, before the step of determining whether the network is online, the method further includes generating a loophole notification according to the detected loophole, and displaying the loophole notification; and triggering a debugging process when a debugging instruction sent by the user is received.

In one embodiment, the step of fixing the loophole when the network is online includes detecting an online status of the network periodically according to a preset time period; and fixing the loophole when it is detected that the network is online.

In one embodiment, after the step of detecting the online status of the network periodically according to the preset time period, the method further includes if timing reaches a preset time threshold and the network is offline, prompting the user with a debugging failure notification.

In another aspect of the present invention, the system for debugging includes a determining module, configured to determine whether a network is online when a loophole is detected; a first repairing module, configured to fix the loophole if the determining module determines that the network is online; and a second repairing module, configured to, if the determining module determines that the network is offline, prompting a user to make the network online, and fixing the loophole when the network is online.

In one embodiment, the system further includes a first display module, configured to generate a loophole notification according to the detected loophole, and displaying the loophole notification. Correspondingly, the second repairing module is further configured to prompt, on the loophole notification, the user to make the network online.

In another embodiment, the system further includes a second display module, configured to generate a loophole notification according to the detected loophole, and displaying the loophole notification; and a triggering module, configured to trigger a debugging process when a debugging instruction sent by the user is received.

In one embodiment, the second repairing module includes a detecting unit, configured to detect an online status of the network periodically according to a preset time period; and a repairing unit, configured to fix the loophole when it is detected that the network is online.

In one embodiment, the system further includes a prompting unit, configured to, after the online status of the network is detected periodically according to the preset time period, and if timing reaches a preset time threshold and the network is offline, prompting the user with a debugging failure notification.

In yet another aspect of the present invention, the non-transitory computer-readable medium storing instructions which, when executed by one or more processors, cause the foregoing disclosed system to perform the foregoing disclosed method for debugging.

The technical solutions provided in the present invention have the following advantages: when the loophole is detected, it is determined whether the network is online; if yes, the loophole is fixed; otherwise, the user is prompted to make the network online, and the loophole is fixed when the network is online, so as to avoid the problem of the debugging failure caused by a failure of patch downloading when the network is offline, thereby reducing the failure rate of debugging.

Further, prompting, on the loophole notification, the user to make the network online may increase the user perception, and increase the friendliness of the debugging. In addition, the online status of the network is detected periodically according to the preset time period; and the loophole is fixed when it is detected that the network is online, so that sufficient time is provided for the user to make the network online, thereby improving the user experience.

These and other aspects of the present invention will become apparent from the following description of the preferred embodiment taken in conjunction with the following drawings, although variations and modifications therein may be affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
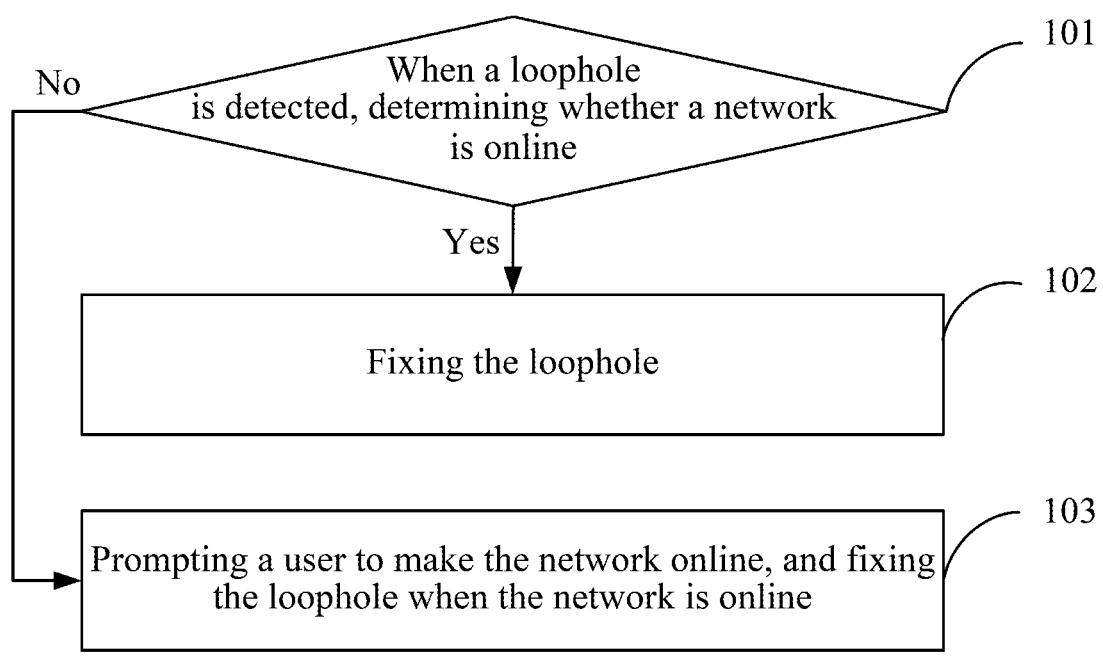
FIG. 1 is a flow chart of a method for debugging according to one embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include a non-transitory tangible computer readable medium such as nonvolatile memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the embodiments of the present invention in conjunction with the accompanying drawings in FIGS. 1-5. It should be understood that specific embodiments described herein are merely intended to explain the present invention, but not intended to limit the present invention. In accordance with the purposes of this invention, as embodied and broadly described herein, this invention, in one aspect, relates to method and system for fixing a loophole, and a non-transitory computer-readable medium storing instructions which, when executed by one or more processors, cause the system to perform the method for fixing the loophole. The loophole is a bug (or vulnerability) in a system installed in a terminal. The terminal may include, but not limited to, a computer, a mobile phone, a tablet computer, a personal digital assistant (PDA), and the like.

Embodiment 1:

Referring to FIG. 1, a flow chart of a method for debugging is shown according to a first embodiment of the present invention. The method includes the following steps:

At step 101: when a loophole is detected, determining whether a network is online;

At step 102: if yes, fixing the loophole; and

At step 103: otherwise, prompting a user to make the network online, and fixing the loophole when the network is online.

In one embodiment, before the step of determining whether the network is online, the method further includes generating a loophole notification according to the detected loophole, and displaying the loophole notification. Correspondingly, the step of prompting the user to make the network online includes: prompting, on the loophole notification, the user to make the network online.

In another embodiment, before the step of determining whether the network is online, the method further includes generating a loophole notification according to the detected loophole, and displaying the loophole notification; and triggering a debugging process when a debugging instruction sent by the user is received.

The step of fixing the loophole when the network is online includes detecting an online status of the network periodically according to a preset time period; and fixing the loophole when it is detected that the network is online.

After the step of detecting the online status of the network periodically according to the preset time period, the method further includes if timing reaches a preset time threshold and the network is offline, prompting the user with a debugging failure notification.

In the method provided in this embodiment, when the loophole is detected, it is determined whether the network is online; if yes, the loophole is fixed; otherwise, the user is prompted to make the network online, and the loophole is fixed when the network is online, so as to avoid the problem of debugging failure caused by patch downloading failure when the network is offline, thereby reducing the failure rate of debugging.

In addition, prompting, on the loophole notification, the user to make the network online may increase the user perception, and increase the friendliness of the debugging; in addition, the online status of the network is detected periodically according to the preset time period; and the loophole is fixed when it is detected that the network is online, so that sufficient time is provided for the user to make the network online, thereby improving the user experience.

Embodiment 2

Figure 2:
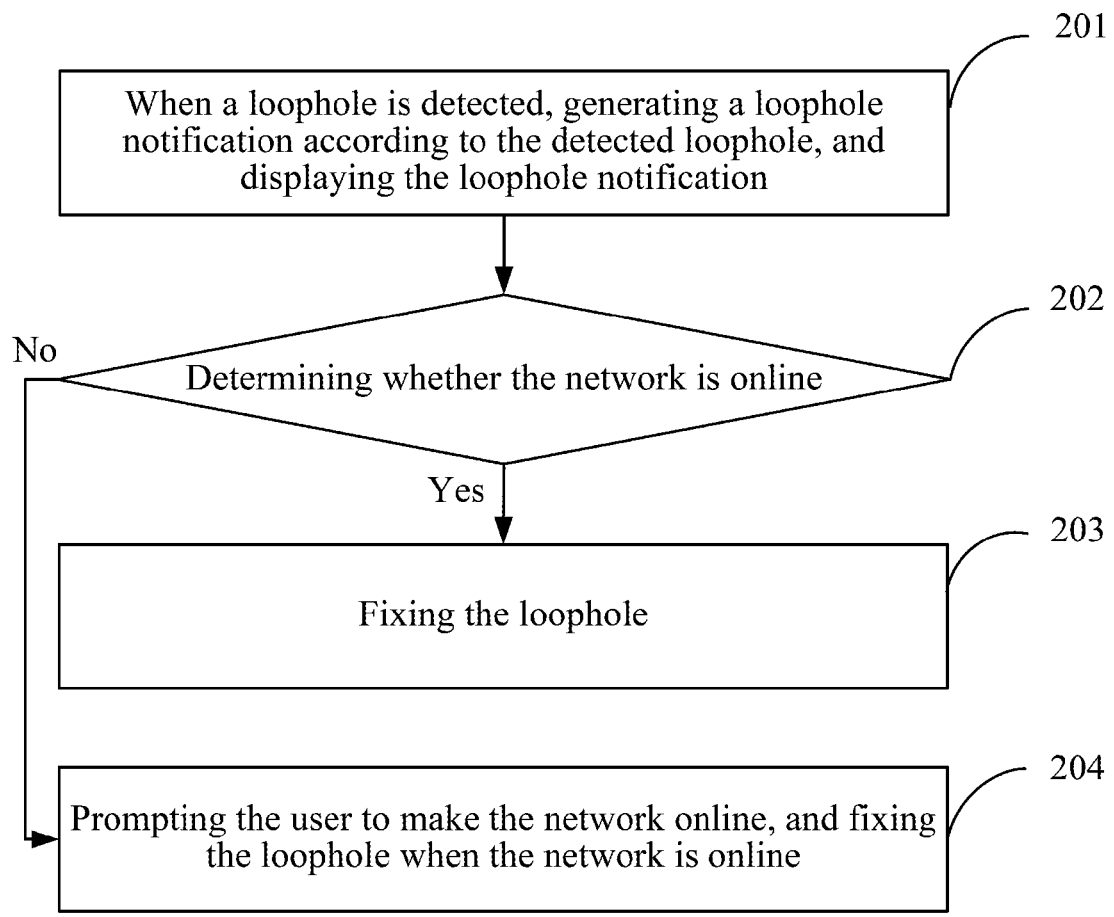
FIG. 2 is a flow chart of a method for debugging according to another embodiment of the present invention.

Referring to FIG. 2, a flow chart of a method for debugging is shown according to a second embodiment of the present invention. The method includes the following steps:

At step 201: when a loophole is detected, generating a loophole notification according to the detected loophole, and displaying the loophole notification.

The loophole refers to a bug (or vulnerability) existing in specific implementations of hardware, software and protocol, or security policy. The loophole (bug) is found during the use of a system. For example, the system has an error when executing a certain operation, and the like. Because the system generates information of the error when having an error, the system may collect the generated error information, and send the collected error information to a server through a terminal, so that developers develop a patch according to the error information. The patch may fix the loophole in the system when being installed. Generally, one patch may repair at least one loophole.

Specifically, various methods for detecting the loophole are provided, for example, information of all files and processes in the system may be acquired, the acquired information is matched with a scanning rule provided by a local loophole policy library, if the information satisfies a matching condition, it is determined that the loophole exists, that is to say, the loophole is detected. The loophole policy library is used to store the scanning rule of the loopholes. The scanning rule is a corresponding matching rule formed by analysis of a security expert on system security loophole and hacking, and experiences of a system administrator about system security configuration. The scanning rule is capable of supporting an application program to automatically perform scanning and analysis on a system loophole. Loopholes are found frequently when the system is used, so that the scanning rule needs to be updated frequently, so as to ensure that the loophole policy library can scan the newly found loopholes. Preferably, the loophole policy library may be acquired from the server when the terminal is in network connected state sometime, and then stored locally, so as to implement off-line scanning on the loopholes.

Alternatively, some software companies publish security bulletin warnings in advance, where the security bulletin warning is used to forecast a loophole to be fixed recently, and then publish security bulletins attached with patches. When the terminal acquires the security bulletin warning when being on-line sometime, the terminal may use the loophole in the security bulletin warning as the detected loophole.

Further, after the loophole is detected, information of the loophole may be displayed to the user, so as to prompt the user to fix the loophole. Specifically, the loophole notification may be generated according to the detected loophole, and the information of the loophole is displayed on the loophole notification, where the information may include, but not limited to, quantity of the loopholes, name of the loopholes, hazards of the loopholes, and the like, so that the user may select the loophole that requires be fixed according to the information of the loopholes. The loophole notification is a process automatically run after boot of the system, and a prompt box is usually popped at the lower right corner of the desktop.

At step 202: determining whether the network is online, if yes, performing step 203; otherwise, performing step 204.

In this embodiment, the system fixes the loophole through the patch downloaded from the server, and therefore, before fixing the loophole, the terminal needs to determine whether the network is online, so as to avoid the problem of path downloading failure when the network is offline.

At step 203: fixing the loophole, and ending the procedure.

In this embodiment, the loophole is fixed when a debugging instruction is received. The debugging instruction may be an instruction automatically sent by a background, or, it is also acceptable that the loophole notification is associated with the debugging process, a debugging button is added on the loophole notification, and if the user selects fixing the loophole at this time, the user may click the repair button on the loophole notification, when the system receives an instruction of the user clicking the debugging button, a debugging process is triggered, and a patch corresponding to the loophole is downloaded and installed, so as to complete the debugging. If the user selects fixing the loophole the next time, the user may select neglecting or closing the loophole notification.

Preferably, after triggering the debugging process, the debugging process may be set as background reparation, and an icon of the debugging process is displayed in the system tray at the lower right corner of the desktop, so as to reduce disturbance on the user. Moreover, to increase the perception of the user on debugging, the loophole notification may be closed, and it is prompted on a system bubble that the loophole is being fixed. The system bubble is a prompt popped in the manner of background reparation, is generally triggered by the background, appears on the icon of the process, and is used to prompt the state of the process.

Further, a display time threshold of the system bubble may be further set, if the timing does not reach the display time threshold and an instruction of the user clicking the system bubble or an instruction of the user clicking the icon of the debugging process is received, the system bubble is switched to the loophole fixing prompt, at this time, the user may operate the debugging process through the loophole fixing prompt, such as, checking repairing process of the loophole, or, stopping fixing the loophole. If the instruction of the user clicking the system bubble is not received and the instruction of the user clicking the icon of the debugging process is not received, the system bubble is displayed, and the system bubble is closed until the timing reaches the display time threshold. After the system bubble is closed, if the instruction of the user clicking the icon of the debugging process is received, the loophole fixing prompt is displayed; and if an instruction of the user pointing to the icon of the debugging process through mouseover, prompt information of the debugging process is displayed. The mouseover is a mouse pointing macro, when the clicking operation is not performed and the mouse is moved to the icon of the debugging process, the prompt information of the debugging process is displayed, such as, prompting the user that the loophole is being repaired.

Of cause, the user may be prompted, through the system bubble, that the loophole repairing is completed, and the debugging process is closed, so as to save system resources. Specifically, the display time threshold of the system bubble may be set, and if the timing reaches the display time threshold, the system bubble is closed, and the debugging process is closed, so as to reduce disturbance for the user.

At step 204: prompting the user to make the network online, fix the loophole when the network is online, and ending the procedure.

In this embodiment, when the network is offline, the terminal cannot establish connection with the server, so that the terminal cannot download the patch from the server, and therefore, the user may be prompted to make the network online, and the loophole is fixed when the network is online.

Specifically, the step (204) of prompting the user to make the network online may include prompting, on the loophole notification, the user to make the network online.

In this embodiment, the user may be prompted, on the loophole notification, to make the network online, for example, the user may be prompted, on the loophole notification in a text form, to make the network online, and the text content may specifically that: The network is not connected, please connect the network first before fixing the loophole, and so on. At this time, the repair button on the loophole notification may be set as not clickable, so as to avoid the problem of debugging failure when the network is not connected. When the network is online, the repair button on the loophole notification restores to be clickable, and the content prompting the user to make the network online disappears.

Further, the step of fixing the loophole when the network is online may include detecting an online status of the network periodically according to a preset time period; and fixing the loophole when it is detected that the network is online.

Specifically, a time period may be set in advance, for example, the time period is set as 5 minutes, or, the time period is set as 10 minutes, and the like, where the setting of the time period is not limited in this embodiment. If the time period is set as 5 minutes, the online status of the network is detected every 5 minutes; if it is detected that the network is online this time, the repair button on the loophole notification is restored to be clickable, and if the instruction of the user clicking the repair button is received, the loophole is fixed, where the procedure of fixing the loophole is the same as the description in the step 203, which is not repeated herein; if it is detected that the network is offline this time, the loophole notification does not changes, the online status of the network is detected once again after 5 minutes, and the circulation stops until it is detected that the network is online.

Alternatively, a time threshold may further be set, and the online status of the network is detected within the time threshold. For example, the time threshold is set as 10 minutes, the online status of the network is detected periodically within 10 minutes. If it is detected that the network is online within 10 minutes, the loophole is fixed, and the specific repairing procedure may be obtained with reference to the description in step 203; if the network is still in non-connected state when timing reaches 10 minutes, the debugging process ends.

Further, after the online status of the network is detected periodically according to the preset time period, the method may further include: if timing reaches the preset time threshold and the network is offline, the user is prompted of debugging failure. At this time, the debugging failure is prompted at the system bubble and the system bubble is not clickable, and after the timing reaches the display time threshold, the system bubble is closed, and the repairing procedure ends.

In the method provided in this embodiment, when the loophole is detected, it is determined whether the network is online; if yes, the loophole is fixed; otherwise, the user is prompted to make the network online, and the loophole is fixed when the network is online, so as to avoid the problem of debugging failure caused by patch downloading failure when the network is offline, thereby reducing the failure rate of debugging.

In addition, prompting, on the loophole notification, the user to make the network online may increase the user perception, and increase the friendliness of the debugging; in addition, the online status of the network is detected periodically according to the preset time period; and the loophole is fixed when it is detected that the network is online, so that sufficient time is provided for the user to make the network online, thereby improving the user experience.

Embodiment 3

Figure 3:
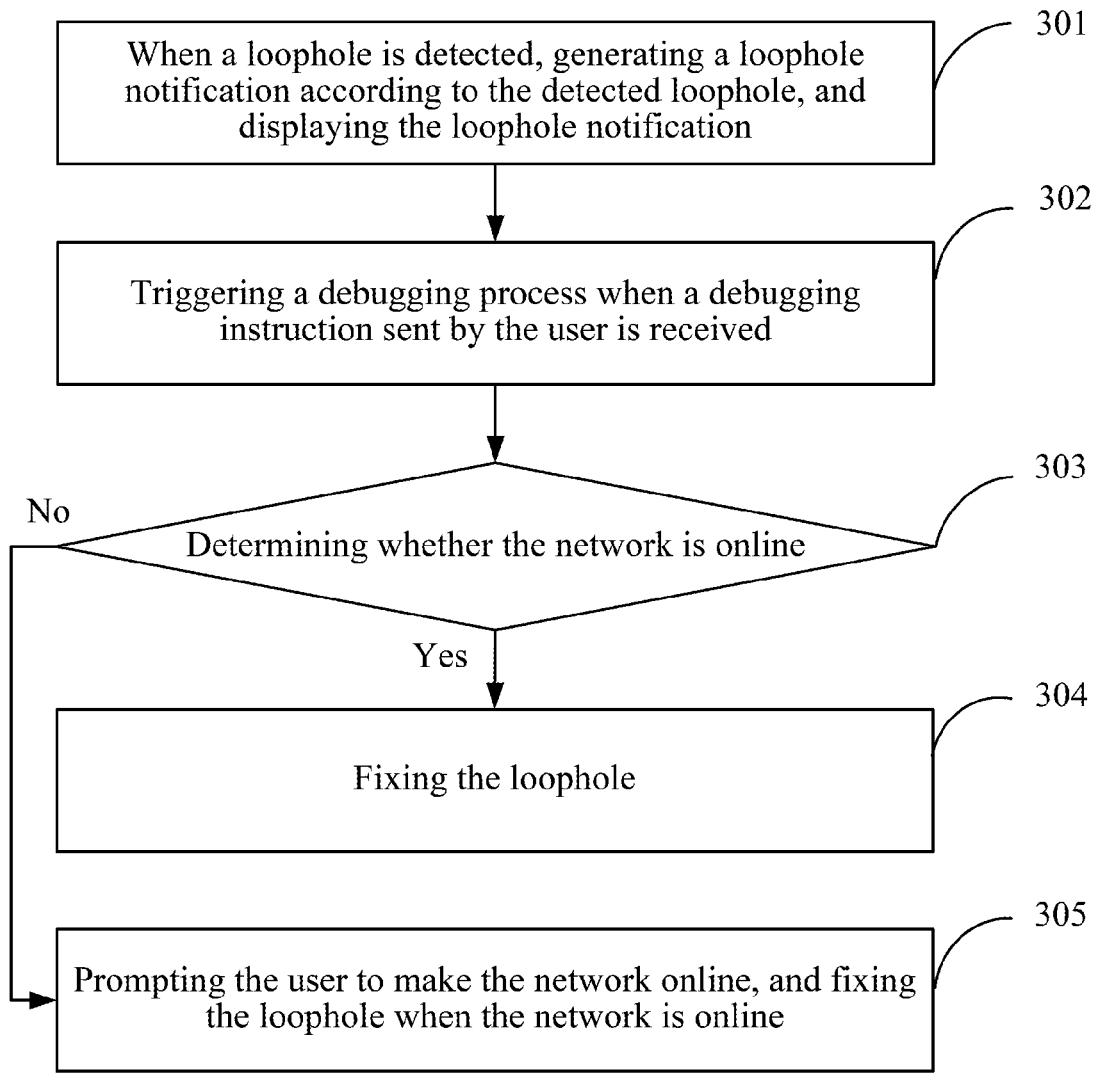
FIG. 3 is a flow chart of a method for debugging according to yet another embodiment of the present invention.

Referring to FIG. 3, a flow chart of a method for debugging is shown according to a third embodiment of the present invention. The method includes the following steps:

At step 301: when a loophole is detected, generating a loophole notification according to the detected loophole, and displaying the loophole notification.

The procedure of detecting the loophole may be obtained with reference to the description in the step 201 of EMBODIMENT 2, and is not repeated herein.

After the loophole is detected, information of the loophole may be displayed to the user, so as to prompt the user to fix the loophole. Specifically, the loophole notification may be generated according to the detected loophole, and the information of the loophole is displayed on the loophole notification, where the information may include, but not limited to, quantity of the loopholes, name of the loopholes, hazards of the loopholes, and the like, so that the user may select the loophole that needs to be fixed according to the information of the vulnerability.

At step 302: triggering a debugging process when a debugging instruction sent by the user is received.

In this embodiment, the loophole is fixed when a debugging instruction is received. The debugging instruction may be an instruction automatically sent by a background, or, it is also acceptable that the loophole notification is associated with the debugging process, and a repair button is added on the loophole notification, so as to simplify the operation of fixing the loophole. If the user selects fixing the loophole at this time, the user may click the repair button on the loophole notification, so as to trigger the debugging process. If the user selects fixing the loophole the next time, the user may select neglecting or closing the loophole notification.

Preferably, after triggering the debugging process, the debugging process may be set as background reparation, which specifically is: an icon of the debugging process is displayed in the system tray at the lower right corner of the desktop, and the loophole notification is closed, so as to reduce disturbance on the user.

At step 303: determining whether the network is online, if yes, performing step 304; otherwise, performing step 305.

In this embodiment, the system fixes the loophole through the patch downloaded from the server, and therefore, before fixing the loophole, the terminal needs to determine whether the network is online, so as to avoid the problem of path downloading failure when the network is offline.

At step 304: fixing the loophole, and ending the procedure.

In this embodiment, after it is determined that the network is online, the debugging process automatically downloads from the server a patch and installs the patch, so as to complete the debugging.

Preferably, it is also acceptable that the debugging being performed is prompted on a system bubble, so as to increase the perception of the user on the debugging. Specifically, a display time threshold of the system bubble may be set, if the timing does not reach the display time threshold and an instruction of the user clicking the system bubble or an instruction of the user clicking the icon of the debugging process is received, the system bubble is switched to the loophole fixing prompt, at this time, the user may operate the debugging process through the loophole fixing prompt, such as, checking repairing process of the loophole, or, stopping fixing the loophole. If the instruction of the user clicking the system bubble is not received and the instruction of the user clicking the icon of the debugging process is not received, the system bubble is displayed, and the system bubble is closed until the timing reaches the display time threshold. After the system bubble is closed, if the instruction of the user clicking the icon of the debugging process is received, the loophole fixing prompt is displayed; and if an instruction of the user pointing to the icon of the debugging process through mouseover, prompt information of the debugging process is displayed, such as, prompting the user that the loophole is being repaired.

Of cause, the user may be prompted, through the system bubble, that the loophole repairing is completed, and the debugging process is closed, so as to save system resources. Specifically, the display time threshold of the system bubble may be set, and if the timing reaches the display time threshold, the system bubble is closed, and the debugging process is closed, so as to reduce disturbance for the user.

At step 305: prompting the user to make the network online, fixing the loophole when the network is online, and ending the procedure.

In this embodiment, when the network is offline, the terminal cannot establish connection with the server, so that the terminal cannot download the patch from the server, and therefore, the user may be prompted to make the network online, and the loophole is fixed when the network is online.

Specifically, the user may be prompted, on the system bubble, to make the network online, for example, the user may be prompted, on the system bubble in a text form, to make the network online, and the text content may specifically that: The network is not connected, please connect the network first before fixing the loophole, and so on. In addition, start timing when the system bubble is displayed, if the timing does not reach a display time threshold of the system bubble and an instruction of the user clicking the icon of the debugging process is received, switch the system bubble to the loophole notification; or, if the timing does not reach the display time threshold and an instruction of the user clicking the system bubble is received, switch the system bubble to the loophole notification; or, if the instruction of clicking the icon of the debugging process is not received and the instruction of clicking the system bubble is not received either, display the system bubble, and close the system bubble until the timing reaches the display time threshold. When the system bubble is switched to the loophole notification, the user is prompted, on the loophole notification, of performing network connection.

Further, after the system bubble is closed, if the instruction of the user clicking the icon of the debugging process is received, the loophole fixing prompt is displayed; or, if an instruction of the user pointing to the icon of the debugging process through mouseover, network prompt information is displayed. The network prompt information may be the same as the system bubble, or different from the system bubble, and the network prompt information and the network connection prompt are both configured to prompt the user to make the network online.

In addition, the step of fixing the loophole when the network is online may include detecting an online status of the network periodically according to a preset time period; and fixing the loophole when it is detected that the network is online.

When the network connection state is detected, a time period may be set in advance, for example, the time period is set as 4 minutes, or, the time period is set as 3 minutes, and the like, where the setting of the time period is not limited in this embodiment. If the time period is set as 3 minutes, the online status of the network is detected every 3 minutes; if it is detected that the network is online this time, the debugging process downloads a patch from the server and installs the patch, so as to complete the debugging, where the procedure of fixing the loophole is the same as the description in the step 304, which is not repeated herein; if it is detected that the network is offline this time, the online status of the network is detected once again after 3 minutes, and the circulation stops until it is detected that the network is online.

Alternatively, a time threshold may further be set, and the online status of the network is detected within the time threshold. For example, the time threshold is set as 10 minutes, the online status of the network is detected periodically within 10 minutes. If it is detected that the network is online within 10 minutes, the loophole is fixed, and the specific repairing procedure may be obtained with reference to the description in step 304; if the network is still in non-connected state when timing reaches 10 minutes, the debugging process ends.

Further, after the online status of the network is detected periodically according to the preset time period, the method may further include: if timing reaches the preset time threshold and the network is offline, the user is prompted of debugging failure. At this time, the debugging failure is prompted at the system bubble and the system bubble is not clickable, and after the timing reaches the display time threshold, the system bubble is closed, and the repairing procedure ends.

In the method provided in this embodiment, when the loophole is detected, it is determined whether the network is online; if yes, the loophole is fixed; otherwise, the user is prompted to make the network online, and the loophole is fixed when the network is online, so as to avoid the problem of debugging failure caused by patch downloading failure when the network is offline, thereby reducing the failure rate of debugging.

In addition, the online status of the network is detected periodically according to the preset time period; and the loophole is fixed when it is detected that the network is online, so that sufficient time is provided for the user to make the network online, thereby improving the user experience.

Embodiment 4

Figure 4:
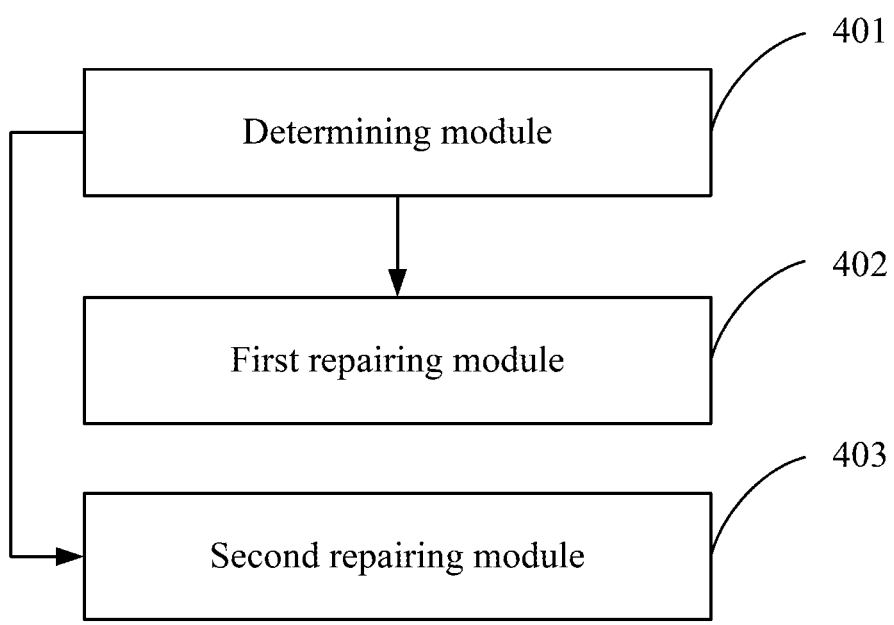
FIG. 4 is a schematic structural diagram of a system for debugging according to one embodiment of the present invention.

Referring to FIG. 4, a schematic structural diagram of a system for debugging is shown according to one embodiment of the present invention. The system includes a determining module 401, configured to determine whether a network is online when a loophole is detected; a first repairing module 402, configured to fix the loophole if the determining module 401 determines that the network is online; and a second repairing module 403, configured to, if the determining module 401 determines that the network is offline, prompting a user to make the network online, and fixing the loophole when the network is online.

Figure 5:
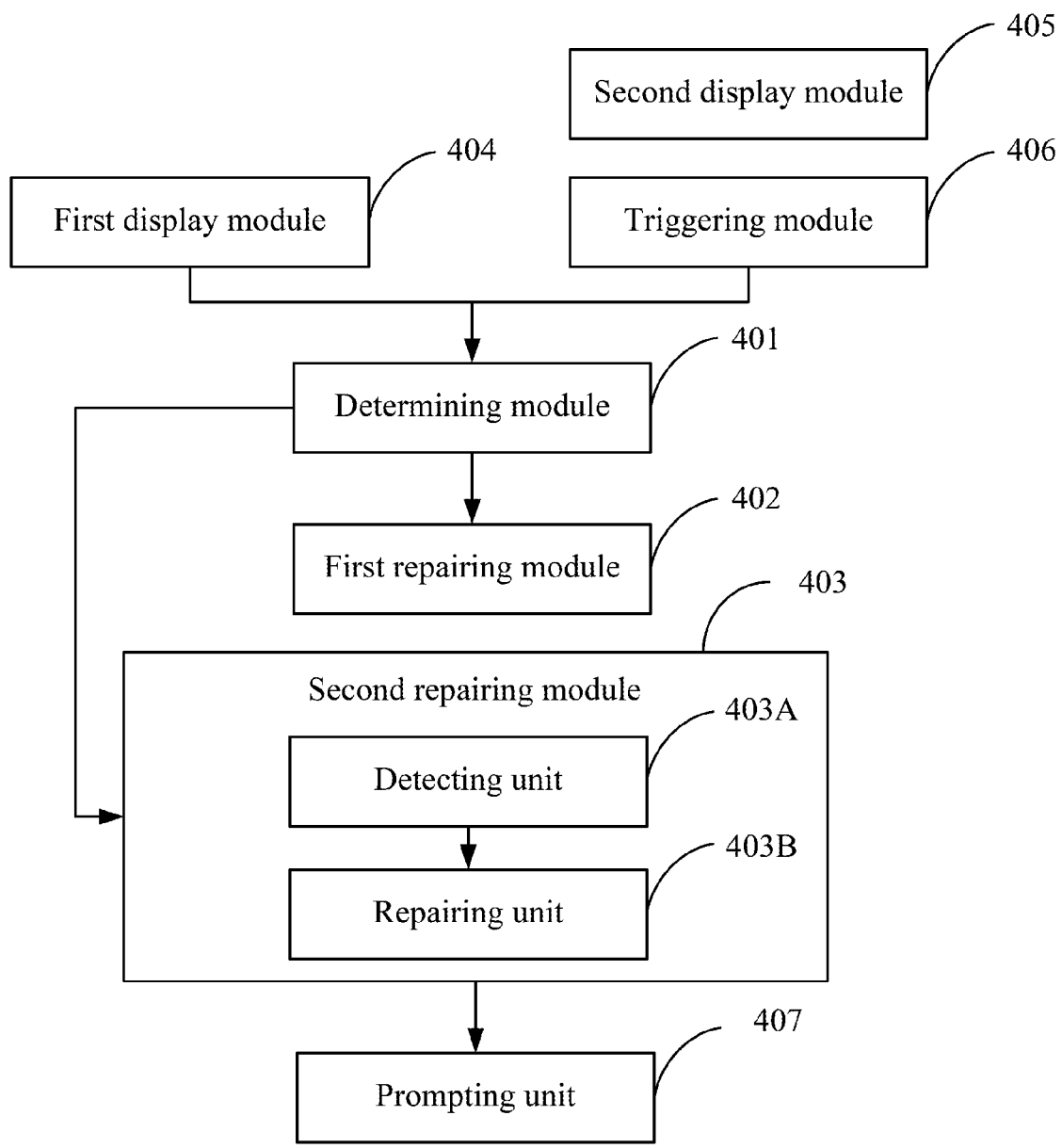
FIG. 5 is another schematic structural diagram of a system for debugging according to one embodiment of the present invention.

Referring to FIG. 5, the system further includes a first display module 404, configured to generate a loophole notification according to the detected loophole, and displaying the loophole notification. Correspondingly, the second repairing module 403 is configured to prompt, on the loophole notification, the user to make the network online.

Referring to FIG. 5, the system further includes a second display module 405, configured to generate a loophole notification according to the detected loophole, and displaying the loophole notification; and a triggering module 406, configured to trigger a debugging process when a debugging instruction sent by the user is received.

Referring to FIG. 5, the second repairing module 403 includes a detecting unit 403A, configured to detect an online status of the network periodically according to a preset time period; and a repairing unit 403B, configured to fix the loophole when it is detected that the network is online.

Referring to FIG. 5, the system further includes a prompting unit 407, configured to, after the online status of the network is detected periodically according to the preset time period, prompt the user with a debugging failure notification if timing reaches a preset time threshold and the network is offline.

The system for debugging provided in this embodiment can execute the method for debugging provided in any method embodiment as described above; the specific procedure may be obtained with reference to the descriptions in the method embodiments, and is not repeated herein.

In the system for debugging provided in this embodiment, when the loophole is detected, it is determined whether the network is online; if yes, the loophole is fixed; otherwise, the user is prompted to make the network online, and the loophole is fixed when the network is online, so as to avoid the problem of debugging failure caused by patch downloading failure when the network is offline, thereby reducing the failure rate of debugging.

In addition, prompting, on the loophole notification, the user to make the network online may increase the user perception, and increase the friendliness of the debugging; in addition, the online status of the network is detected periodically according to the preset time period; and the loophole is fixed when it is detected that the network is online, so that sufficient time is provided for the user to make the network online, thereby improving the user experience.

It should be noted that, when fixing the loophole, as for the system for debugging provided in the above embodiment, illustration is made by taking division of various function modules as an example, and in an actual application, the functions may be allocated to be implemented by different function modules as required, that is to say, an internal structure of the system is divided into different function modules, so as to implement all or part of functions as described above. In addition, the system for debugging provided in the above embodiment and the method embodiments for debugging belong to the same conception, the specific implementation procedure may be obtained with reference to the method embodiments, and is not repeated herein.

The numbers of the embodiments of the present invention are only configured to description, instead of representing the priorities of the embodiments.

All or part of steps in the embodiments of the present invention may be implemented through software, and a corresponding software program may be stored in a non-transitory tangible computer-readable medium.

In yet another aspect of the present invention, the non-transitory tangible computer-readable medium storing instructions or codes which, when executed by one or more processors, cause the above system to perform the above method for debugging. The non-transitory tangible computer-readable storage medium includes, but not limited to, disk, CD-ROM, read-only memory (ROM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for debugging, comprising:
when a loophole is detected, determining whether a network is online;
if yes, fixing the loophole; and
otherwise, prompting a user to make the network online, and fixing the loophole when the network is online,
wherein the step of fixing the loophole when the network is online comprises:
detecting an online status of the network periodically according to a preset time period; and
fixing the loophole when it is detected that the network is online;
the method further comprising, after the step of detecting the online status of the network periodically according to a preset time period:
if timing reaches a preset time threshold and the network is offline, prompting the user with a debugging failure notification.

2. The method according to claim 1, prior to the step of determining whether the network is online, further comprising:
generating a loophole notification according to the detected loophole, and displaying the loophole notification,
wherein the step of prompting the user to make the network online comprises prompting, on the loophole notification, the user to make the network online.

3. The method according to claim 1, prior to the step of determining whether the network is online, further comprising:
generating a loophole notification according to the detected loophole, and displaying the loophole notification; and
triggering a debugging process when a debugging instruction sent by the user is received.

4. A system for debugging, comprising:
a determining module, configured to determine, when a loophole is detected, whether a network is online;

a first repairing module, configured to fix the loophole if the determining module determines that the network is online;

a second repairing module, configured to, if the determining module determines that the network is offline, prompt a user to make the network online, and fix the loophole when the network is online, wherein the second repairing module comprises:

a detecting unit, configured to detect an online status of the network periodically according to a preset time period; and a repairing unit, configured to fix the loophole when it is detected that the network is online; and a prompting module, configured to, after the online status of the network is detected periodically according to the preset time period, and if timing reaches a preset time threshold and the network is offline, prompt the user with a debugging failure notification.

5. The system according to claim 4, further comprising:

a first display module, configured to generate a loophole notification according to the detected loophole, and display the loophole notification, wherein the second repairing module is further configured to prompt, on the loophole notification, the user to make the network online.

6. The system according to claim 4, further comprising:

a second display module, configured to generate a loophole notification according to the detected loophole, and display the loophole notification, a triggering module, configured to trigger a debugging process when a debugging instruction sent by the user is received.

7. A non-transitory computer-readable medium storing instructions which, when executed by one or more processors, cause a system to perform a method for debugging, the method comprising:

when a loophole is detected, determining whether a network is online;

if yes, fixing the loophole; and otherwise, prompting a user to make the network online, and fixing the loophole when the network is online, wherein the step of fixing the loophole when the network is online comprises:

detecting an online status of the network periodically according to a preset time period; and fixing the loophole when it is detected that the network is online wherein the method further comprises, after the step of detecting the online status of the network periodically according to a preset time period:

if timing reaches a preset time threshold and the network is offline, prompting the user with a debugging failure notification.

8. The non-transitory computer-readable medium according to claim 7, wherein the method further comprises, prior to the step of determining whether the network is online, generating a loophole notification according to the detected loophole, and displaying the loophole notification, wherein the step of prompting the user to make the network online comprises prompting, on the loophole notification, the user to make the network online.

9. The non-transitory computer-readable medium according to claim 7, wherein the method further comprises, prior to the step of determining whether the network is online, generating a loophole notification according to the detected loophole, and displaying the loophole notification; and triggering a debugging process when a debugging instruction sent by the user is received.

\* \* \* \* \*